(12) United States Patent
Liu et al.

(10) Patent No.: US 12,437,824 B2
(45) Date of Patent: Oct. 7, 2025

(54) CONFIGURATION METHOD AND READING METHOD OF 3D MEMORY DEVICE, 3D MEMORY DEVICE, AND MEMORY SYSTEM

(71) Applicant: YANGTZE MEMORY TECHNOLOGIES CO., LTD., Wuhan (CN)

(72) Inventors: Hongtao Liu, Wuhan (CN); Songmin Jiang, Wuhan (CN); Dejia Huang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 156 days.

(21) Appl. No.: 18/090,423

(22) Filed: Dec. 28, 2022

(65) Prior Publication Data

US 2023/0148136 A1 May 11, 2023

Related U.S. Application Data

(63) Continuation of application No. PCT/CN2021/143360, filed on Dec. 30, 2021.

(30) Foreign Application Priority Data

Jan. 15, 2021 (CN) .......................... 202110054084.7

(51) Int. Cl.
*G11C 29/12* (2006.01)
(52) U.S. Cl.
CPC .... *G11C 29/1201* (2013.01); *G11C 29/12005* (2013.01); *G11C 2029/1202* (2013.01)

(58) Field of Classification Search
CPC .......... G11C 29/1201; G11C 29/12005; G11C 2029/1202; G11C 2207/2245;
(Continued)

(56) References Cited

U.S. PATENT DOCUMENTS 8,081,508 B2 * 12/2011 Kim ....................... G11C 16/10
365/185.24
2005/0116257 A1 6/2005 Oakes et al.
(Continued)

FOREIGN PATENT DOCUMENTS

CN 1591875 A 3/2005
CN 103633046 A 3/2014
(Continued)

OTHER PUBLICATIONS

International Search Report issued in corresponding International Application No. PCT/CN2022/078785, mailed on Jun. 2, 2022, 5 pages.

*Primary Examiner* — Mohammed A Bashar
(74) *Attorney, Agent, or Firm* — BAYES PLLC

(57) ABSTRACT

The present disclosure provides a configuration method and a reading method for a 3D memory, a 3D memory and system. The configuration method includes: writing test data into a plurality of selected memory cells corresponding to a selected word line in one of a plurality of memory blocks of the memory device; determining threshold voltages of the plurality of selected memory cells; and obtaining a relationship table indicating a corresponding relationship between a number of a subset of the selected memory cells that have threshold voltages lower than a preset voltage and a pass voltage required for performing a read operation on the one memory block.

20 Claims, 10 Drawing Sheets

(58) Field of Classification Search
CPC . G11C 11/5642; G11C 16/26; G11C 16/0483; G11C 8/08; G11C 16/08; G11C 16/3427; G11C 29/44; G11C 29/021; G11C 29/028; G11C 29/50004
See application file for complete search history.

(56) References Cited

U.S. PATENT DOCUMENTS

| | | | |
|---|---|---|---|
| 2015/0071008 A1 | 3/2015 | Yang et al. | |
| 2020/0167096 A1* | 5/2020 | Kang | G11C 16/3495 |
| 2021/0357289 A1* | 11/2021 | Kurose | G11C 29/46 |
| 2022/0277798 A1* | 9/2022 | Muchherla | G11C 29/028 |

FOREIGN PATENT DOCUMENTS

| | | |
|---|---|---|
| CN | 106104800 A | 11/2016 |
| CN | 108986865 A | 12/2018 |
| CN | 110970074 A | 4/2020 |
| CN | 111951867 A | 11/2020 |
| CN | 112331653 A | 2/2021 |
| CN | 112820328 A | 5/2021 |

* cited by examiner

CONFIGURATION METHOD AND READING METHOD OF 3D MEMORY DEVICE, 3D MEMORY DEVICE, AND MEMORY SYSTEM

CROSS REFERENCE TO RELATED APPLICATION

This application is a continuation of International Application No. PCT/CN2021/143360, filed on Dec. 30, 2021, which claims the benefit of priority to China Patent Application No. 202110054084.7 and filing date Jan. 15, 2021, both of which are incorporated herein by reference in their entireties.

TECHNICAL FIELD

The present disclosure relates to the technical field of storage, and in particular to a configuration method and a reading method of a three-dimensional (3D) memory device, a 3D memory device, and a memory system.

BACKGROUND

The improvement of memory density of memory devices is closely related to the progress of semiconductor manufacturing processes. As the feature sizes of semiconductor manufacturing processes become smaller and smaller, the memory density of memory devices becomes higher and higher. In order to further improve the memory density, a memory device of a three-dimensional structure (i.e., a 3D memory device) has been developed. The 3D memory device includes a plurality of memory cells stacked in a vertical direction. The level of integration can be multiplied on a wafer per unit area, and the cost can be reduced.

3D memory device is mainly used as a non-volatile flash memory. Two main non-volatile flash memory technologies adopt NAND and NOR structures, respectively. Compared to the NOR memory device, NAND memory devices have slower reading speed, but faster writing speed, simpler erasing operation, and can realize smaller memory cells, thus achieving higher memory density. Therefore, 3D memory devices with NAND structure have been widely applied.

In an exemplary 3D memory device, a plurality of memory cell strings are arranged in a two-dimensional array. Each memory cell string is connected between a source line and a bit line and includes a plurality of memory cells stacked in a vertical direction, so that the plurality of memory cell strings together form a plurality of memory cells arranged in a three-dimensional array. Each memory cell includes a gate conductor, a channel region, and a tunneling dielectric layer, a charge storage layer, and a blocking dielectric layer which are sandwiched therebetween. Data is read in a selected memory cell using the reading method. The memory cell string includes a plurality of memory cells sharing a channel pillar. In the reading operation, not only a read voltage is applied to a gate conductor of the selected memory cell to read the data in the memory cell, but also a pass voltage is applied to a gate conductor of an unselected memory cell to suppress reading. The pass voltage applied to a gate conductor of a memory transistor causes a threshold voltage in the memory transistor to drift to a high voltage direction, which makes it easier to make mistakes when reading data in a memory block, and reduces the reliability of read data.

In the 3D memory device, lowering the pass voltage can suppress the read disturbance to unselected memory transistors. Because of charge leakage, a highest-state threshold in the memory transistor drifts to a low voltage direction, and the pass voltage will be reduced accordingly. Therefore, it is desirable to dynamically reduce the pass voltage of memory cells to reduce the read disturbance to unselected memory transistors.

SUMMARY

In view of the above-mentioned problems, the present disclosure provides a configuration method and a reading method of a 3D memory (also referred as a 3D memory device), a 3D memory and system, which dynamically reduces a pass voltage of a memory cell, so as to reduce read disturbance caused by a reading operation and increase the reliability of data storage.

According to an aspect of the present disclosure, there is provided a configuration method of a 3D memory, the 3D memory includes a plurality of memory blocks, and the configuration method includes: writing data in a plurality of selected memory cells corresponding to a selected word line in a certain memory block among the plurality of memory blocks; measuring threshold voltages of the selected memory cells; and obtaining a relationship table, the relationship table indicating a corresponding relationship between a number of memory cells with threshold voltages less than a first predetermined voltage among the plurality of selected memory cells and a pass voltage required for performing a read operation on the certain memory block.

In some implementations, the 3D memory includes a configuration block, and the configuration method further includes: writing the relationship table into the configuration block.

In some implementations, the data written in the plurality of selected memory cells is known data; and the known data indicates that both the stored data and a threshold voltage distribution corresponding to the stored data are known.

In some implementations, the obtaining a relationship table includes: repeatedly writing the data and measuring the threshold voltages of the plurality of selected memory cells to obtain the relationship table.

In some implementations, the writing data in a plurality of selected memory cells corresponding to a selected word line in a certain memory block among the plurality of memory blocks including: applying a programming voltage to the selected word line, and applying a low voltage VPS1 to unselected word lines in the certain memory block.

In some implementations, the configuration block stores the relationship table of one or more of the memory blocks.

In some implementations, in the relationship table, the greater the number of the selected memory cells with the threshold voltages less than the first predetermined voltage among the plurality of selected memory cells is, the smaller the corresponding pass voltage is.

In some implementations, the pass voltage is greater than a highest-state threshold of the memory cell, and a difference between the pass voltage and the highest-state threshold of the memory cell is equal to a second predetermined voltage.

According to another aspect of the present disclosure, there is provided is a reading method of a 3D memory, the 3D memory includes a plurality of memory blocks, and the reading method includes: acquiring a data reading request, the data reading request including an address of data to be read; determining a memory block where the data to be read is located according to the address of the data to be read; and the memory block belongs to any memory block of the plurality of memory blocks; reading a selected word line of the memory block to obtain a number of memory cells with threshold voltages less than a first predetermined voltage among a plurality of selected memory cells corresponding to the selected word line; looking up a relationship table to obtain a pass voltage required for performing a read operation on the memory block corresponding to the number of the memory cells with the threshold voltages less than the first predetermined voltage among the plurality of selected memory cells; and applying the pass voltage on a non-read word line and applying a read voltage on a read word line to obtain the data to be read; wherein the relationship table is used for indicating a corresponding relationship between the number of the memory cells with the threshold voltages less than the first predetermined voltage among the plurality of selected memory cells and the pass voltage.

In some implementations, the 3D memory further includes a configuration block, and the relationship table is stored in the configuration block.

In some implementations, the relationship table is obtained by the configuration method of a disclosed 3D memory.

In some implementations, the reading a selected word line of the memory block to obtain a number of memory cells with threshold voltages less than a first predetermined voltage among a plurality of selected memory cells corresponding to the selected word line includes: applying the first predetermined voltage on the selected word line to detect a threshold voltage of each of the selected memory cells of the plurality of selected memory cells corresponding to the selected word line, and if the threshold voltage of a certain selected memory cell is less than the first predetermined voltage, determining that the selected memory cell is a memory cell having a threshold voltage less than the first predetermined voltage, so as to obtain the number of the memory cells with the threshold voltages less than the first predetermined voltage among the plurality of selected memory cells.

In some implementations, the configuration block stores the relationship table of one or more of the memory blocks.

In some implementations, the pass voltage is less than or equal to an initial pass voltage of the memory block.

In some implementations, in the relationship table, the greater the number of the memory cells being less than the first predetermined voltage is, the smaller the corresponding pass voltage is.

In some implementations, the pass voltage is greater than the highest-state threshold of the memory cell, and a difference between the pass voltage and the highest-state threshold of the memory cell is equal to a second predetermined voltage.

According to a third aspect of the present disclosure, there is provided a 3D memory, and the 3D memory includes: a memory array, including a plurality of memory blocks; and a control circuit connected through a memory interface; wherein the control circuit is configured to: write data in a plurality of selected memory cells corresponding to a selected word line in a certain memory block among the plurality of memory blocks; measure threshold voltages of the plurality of selected memory cell; and obtain a relationship table, the relationship table indicating a corresponding relationship between a number of memory cells with threshold voltages less than a first predetermined voltage among the plurality of selected memory cells and a pass voltage required for performing a read operation on the certain memory block.

In some implementations, the memory array further includes a configuration block, and the control circuit is further configured to write the relationship table into the configuration block.

In some implementations, the control circuit is further configured to: acquire a data reading request, the data reading request including an address of data to be read; determine a memory block where the data to be read is located according to the address of the data to be read; the memory block belongs to one of the plurality of memory blocks; read a selected word line of the memory block to obtain a number of memory cells with threshold voltages less than a first predetermined voltage among a plurality of selected memory cells corresponding to the selected word line; look up the relationship table to obtain a pass voltage required for performing a read operation on the memory block corresponding to the number of the memory cells with the threshold voltages less than the first predetermined voltage among the plurality of selected memory cells; and apply the pass voltage on a non-read word line and apply a read voltage on a read word line to obtain the data to be read.

In some implementations, the pass voltage is less than or equal to an initial pass voltage of the memory block.

In some implementations, the control circuit includes: a processor, said processor is to implement an access request for accessing the memory array and manage data in the memory array; and a cache connected with the processor and is to cache data to be written into the memory array or cache data read from the memory array.

The present disclosure further provides a memory system, including: any 3D memory described above; and a controller connected through a control interface, wherein the controller controls the 3D memory through the control interface.

In some implementations, the memory system further includes a communication interface through which the controller communicates with a coupled host to receive an operation command of the host.

In some implementations, the communication interface is one of: a Serial Advanced Technology Attached (SATA) interface, a High-Speed Peripheral Component Interconnect Express (PCIe) interface, a PCI interface, a PCI-X interface, a Universal Serial Bus (USB) interface, a Universal Flash Storage (UFS) interface, or an eMMC interface.

According to the configuration method and reading method of a 3D memory, the 3D memory and system provided by the disclosure, the pass voltage is dynamically adjusted according to reading times of the memory blocks and threshold distribution of the memory cells, and the pass voltage is dynamically reduced on the premise of ensuring that the pass voltage is higher than a highest-stage threshold voltage, so that the read disturbance caused by reading the memory blocks is reduced, and the reliability of data storage is increased, thereby improving the overall read performance of the 3D memory.

Further, according to the configuration method and reading method of a 3D memory, the 3D memory and system provided by the disclosure, a relationship table is stored in the configuration block of the memory array in advance, and the relationship table records the relationship between the number of memory cells being less than the first predetermined voltage and the corresponding pass voltage. In the reading method, the control circuit quickly selects the corresponding pass voltage from the relationship table according to the detected number of memory cells being less than the first predetermined voltage on the selected word line, without the need for a user to manually adjusting the pass voltage, which is more convenient, and at the same time, there is no need to open an interface for adjusting the pass voltage, thereby ensuring the security and stability of the 3D memory.

Further, the pass voltage is independently adjusted for each of the memory blocks in the 3D memory, the control circuit independently adjusts the pass voltage of respective memory blocks according to the number of memory cells being less than the first predetermined voltage on the selected word line in different memory blocks, the pass voltage of the memory block with more reading times is relatively low, and the pass voltage of the memory block with fewer reading times is relatively high, so that it is unnecessary to unify the pass voltages of all memory blocks at a high potential, thus further improving the overall performance of the 3D memory.

BRIEF DESCRIPTION OF THE DRAWINGS

The above and other objects, features and advantages of the present disclosure will be more apparent from the following description of the present disclosure with reference to the accompanying drawings, in which:

FIG. 15 (B) shows a schematic diagram of an exemplary Solid State Drive (SSD) having a memory system according to some aspects provided by the present disclosure.

DETAILED DESCRIPTION

Figure 1A:
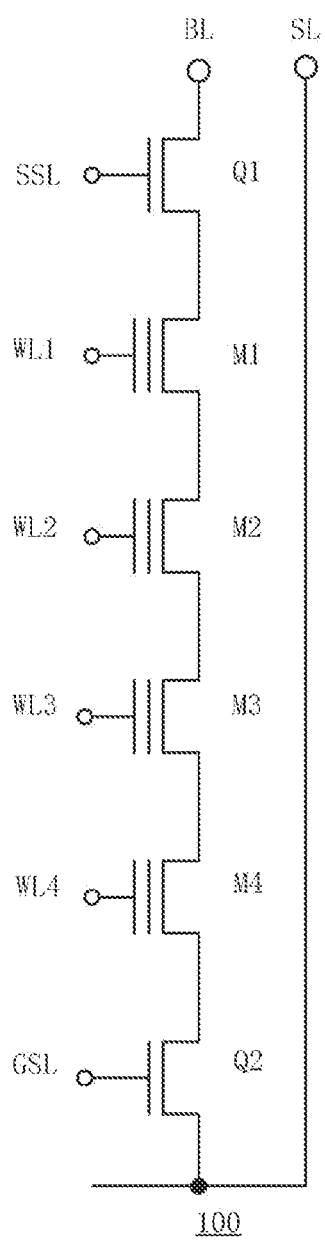
FIGS. 1a and 1b respectively show a circuit diagram and a schematic structural diagram of a memory cell string of a 3D memory device.

Various implementations of the present disclosure will be described in more detail below with reference to the accompanying drawings. In each drawing, the same elements or modules are denoted by the same or similar reference numerals. For the sake of clarity, various parts in the drawings are not drawn to scale.

It should be understood that in the following description, "circuit" may include a single or multiple combined hardware circuits, programmable circuits, state machine circuits and/or elements capable of storing instructions executed by the programmable circuits. When an element or circuit is referred to as being "connected to" another element or "connected" between two nodes, it may be directly coupled or connected to another element or there may be intermediate elements, and the connection between elements may be physical, logical, or a combination thereof. On the contrary, when an element is referred to as being "directly coupled" or "directly connected" to another element, it means that there is no intermediate element between them.

Meanwhile, some terms are used in this description and claims to refer to specific components. It should be understood by those skilled in the art that hardware manufacturers may refer to the same component by different terms. In the description and claims of the present disclosure, differences in names are not used as a method for distinguishing among components, but differences in functions of components are used as a criterion for distinguishing.

In addition, it should be noted herein that, relational terms such as first and second are only used to distinguish one entity or operation from another entity or operation, and do not necessarily require or imply any such actual relationship or sequence between these entities or operations. Furthermore, the terms "include", "comprise" or any other variation thereof are intended to cover non-exclusive inclusion, such that a process, method, article or apparatus including a series of elements not only includes those elements, but also includes other elements not explicitly listed, or also includes elements inherent to such process, method, article or apparatus. Without further restrictions, an element defined by the statement "including one . . . " does not exclude the presence of other identical elements in the process, method, article or apparatus that includes the element.

Figure 1B:
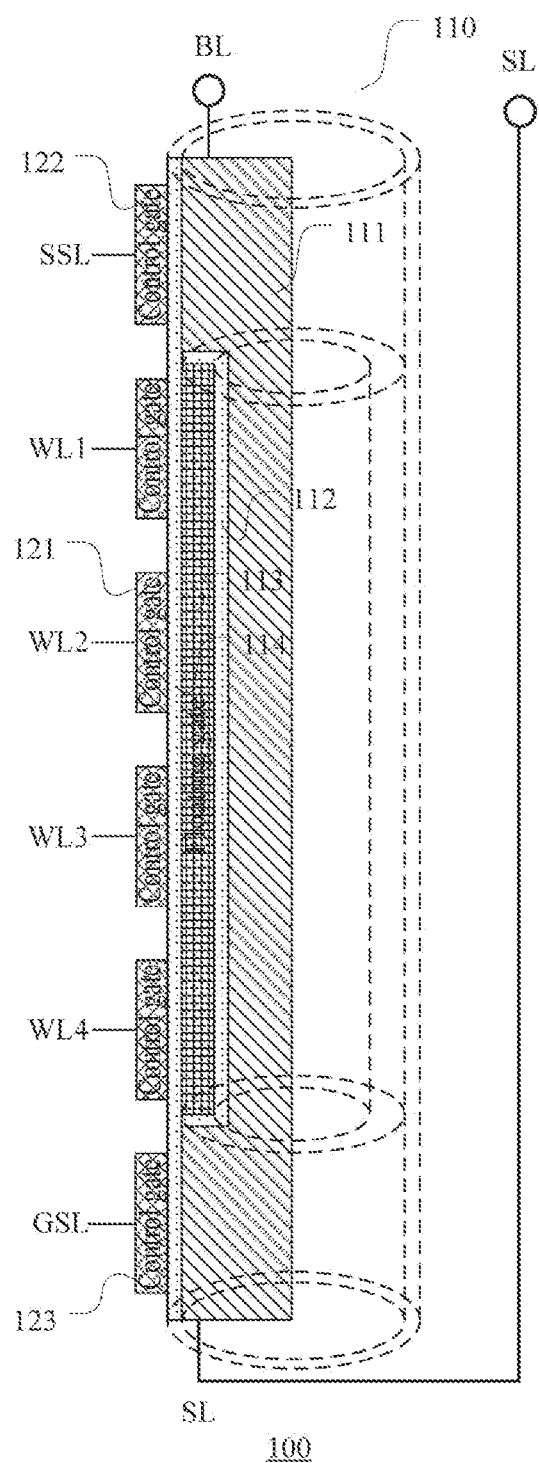

FIGS. 1a and 1b respectively show a circuit diagram and a schematic structural diagram of a memory cell string of a 3D memory (also referred as a 3D memory device). In this implementation, the memory cell string shown includes 4 memory cells. It can be understood that the present disclosure is not limited thereto, and the number of memory cells in the memory cell string can be any plurality, for example, 32 or 64.

As shown in FIG. 1a, a first end of the memory cell string 100 is connected to a bit line BL, and a second end of the memory cell string 100 is connected to a source line SL. The memory cell string 100 includes a plurality of transistors connected in series between the first end and the second end, including a first selection transistor Q1, memory transistors (hereinafter also referred to as memory cells) M1 to M4, and a second selection transistor Q2. A gate of the first selection transistor Q1 is connected to the string selection line SSL, and a gate of the second selection transistor Q2 is connected to a ground selection line GSL. Gates of the memory transistors M1 to M4 are connected to corresponding word lines WL1 to WL4, respectively.

As shown in FIG. 1B, the first selection transistor Q1 and the second selection transistor Q2 of the memory cell string 100 include gate conductors 122 and 123, and the memory transistors M1 to M4 respectively include a gate conductor 121. The gate conductors 121, 122, and 123 are stacked in an identical order as the transistors in the memory cell string 100, and adjacent gate conductors are separated from each other by an interlayer insulating layer, thus forming a gate stack structure. Further, the memory cell string 100 includes a channel pillar 110. The channel pillar 110 penetrates the gate stack structure. In the middle part of the channel pillar 110, a tunneling dielectric layer 112, a charge storage layer 113 and a blocking dielectric layer 114 are sandwiched between the gate conductor 121 and a channel region 111, thereby forming the memory transistors M1 to M4. At both ends of the channel pillar 110, the blocking dielectric layer 114 is sandwiched between the gate conductors 122 and 123 and the channel region 111, thereby forming the first selection transistor Q1 and the second selection transistor Q2.

In this implementation, the channel region 111 is composed of for example doped polysilicon, the tunneling dielectric layer 112 and the blocking dielectric layer 114 are respectively composed of an oxide such as silicon oxide, the charge storage layer 113 is composed of an insulating layer containing quantum dots or nanocrystals such as silicon nitride containing metal or semiconductor particles, and the gate conductors 121, 122 and 123 are composed of a metal, such as tungsten. The channel region 111 is used to provide a channel region for the selection transistors and the memory transistors, and the channel region 111 has a same doping type as the selection transistors and the memory transistors. For example, for N-type selection transistors and memory transistors, the channel region 111 may be N-type doped polysilicon.

In this implementation, the channel pillar 110 has a core which is the channel region 111, and the tunneling dielectric layer 112, the charge storage layer 113 and the blocking dielectric layer 114 form a stack structure around a sidewall of the core. In an alternative implementation, the core of the channel pillar 110 is an additional insulating layer, and the channel region 111, the tunneling dielectric layer 112, the charge storage layer 113 and the blocking dielectric layer 114 form a stack structure around the core.

In this implementation, the first selection transistor Q1, the second selection transistor Q2, and the memory transistors M1 to M4 use the common channel region 111 and blocking dielectric layer 114. In the channel pillar 110, the channel region 111 provides source and drain regions and channel regions of multiple transistors. In an alternative implementation, semiconductor layers and blocking dielectric layers of the first and second selection transistors Q1 and Q2, and semiconductor layers and blocking dielectric layers of the memory transistors M1 to M4 can be formed respectively by steps independent from each other.

Figure 2:
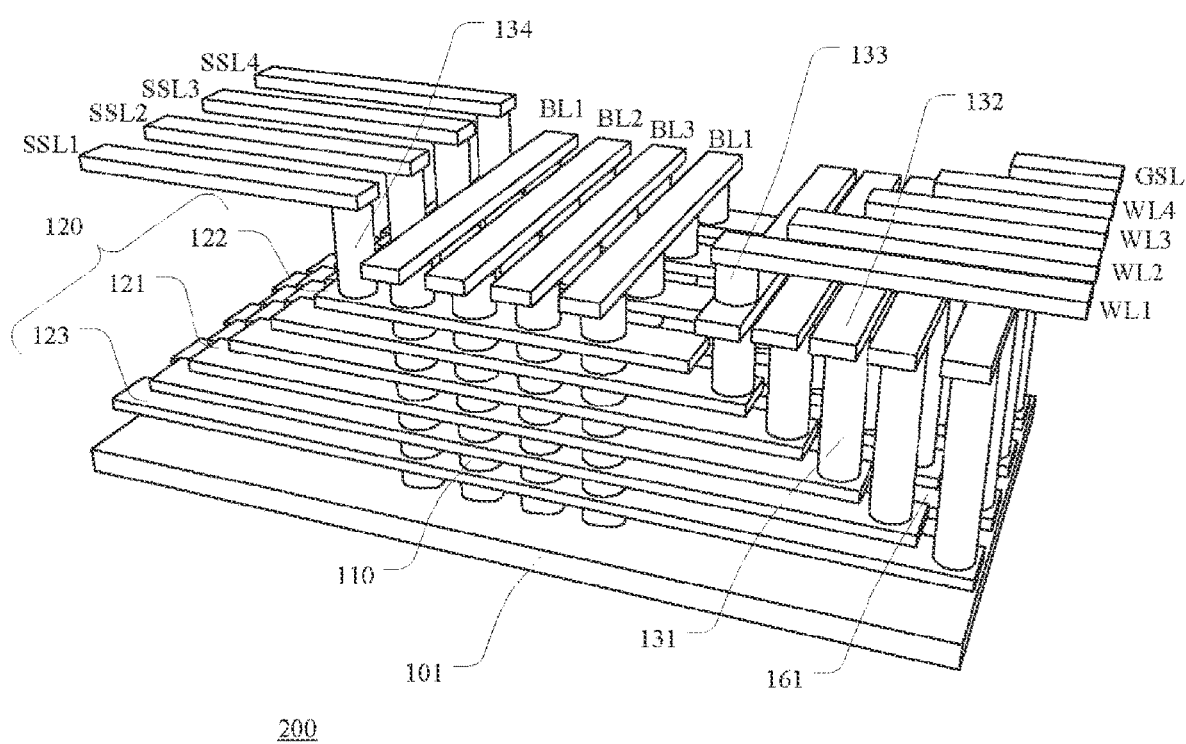
FIG. 2 shows a perspective view of the 3D memory device.

FIG. 2 shows a perspective view of a 3D memory. For the sake of clarity, various insulating layers in the 3D memory is not shown in FIG. 2.

The 3D memory 200 shown in this implementation includes 4*4, that is, a total of 16 memory cell strings 100, and each memory cell string 100 includes 4 memory cells, thus forming a memory array of 4*4*4, that is, a total of 64 memory cells. It can be understood that the present disclosure is not limited thereto, and the 3D memory may include any plural number of memory cell strings, for example, 1024, and each memory cell string may have any plural number of memory cells, for example, 32 or 64.

In the 3D memory 200, the memory cell strings include respective channel pillars 110 and common gate conductors 121, 122 and 123, respectively. The gate conductors 121, 122, and 123 are stacked in an identical order as the transistors in the memory cell strings 100, and adjacent gate conductors are separated from each other by an interlayer insulating layer, thereby forming a gate stack structure 120. The interlayer insulating layers are not shown in the figure.

The channel pillars 110 has an internal structure as shown in FIG. 1B, which will not be described in detail here. The channel pillars 110 penetrate through the gate stack structure 120 and are arranged in an array. First ends of a plurality of channel pillars 110 in a same column are all connected to a same bit line (i.e., one of bit lines BL1 to BL4), second ends of the plurality of channel pillars 110 are all connected to a substrate 101, and the second ends form a common source connection via the substrate 101.

The gate conductor 122 of the first selection transistor Q1 is divided into different gate lines by gate line slits 102. The gate line of a plurality of channel pillars 110 in a same row are all connected to a same string selection line (i.e., one of string selection lines SSL1 to SSL4).

The gate conductors 121 of the memory transistors M1 and M4 are connected to corresponding word lines, respectively. If the gate conductors 121 of the memory transistors M1 and M4 are divided into different gate lines by gate line slits 161, the gate lines at a same layer reach an interconnection layer 132 via respective conductive channels 131, thus being interconnected with each other, and then are all connected to a same word line (i.e., one of word lines WL1 to WL4) via conductive channels 133.

The gate conductor of the second selection transistor Q2 is connected integrally. If the gate conductor 123 of the second selection transistor Q2 is divided into different gate lines by the gate line slits 161, the gate lines reach the interconnection layer 132 via respective conductive channels 131, thus being interconnected with each other, and then are connected to a same ground selection line GSL via conductive channels 133.

Figure 3:
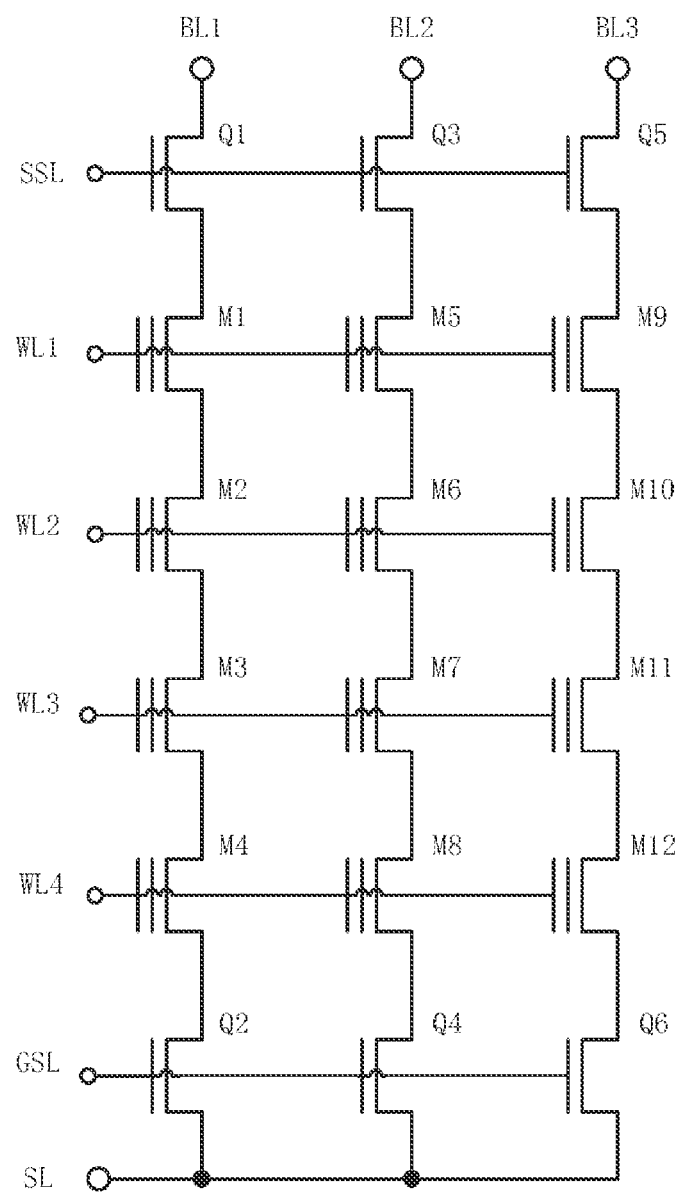
FIG. 3 shows a circuit diagram of memory blocks of a 3D memory.

FIG. 3 shows a circuit diagram of a memory block of a 3D memory. The memory block 300 shown in this implementation includes three memory cell strings 100. It can be understood that the present disclosure is not limited thereto, and the number of the memory cell strings 100 in the memory block 300 may be any plurality.

As shown in FIG. 3, the memory block 300 includes three memory cell strings 100. First end of each memory cell string 100 is connected to a bit line BL1, a bit line BL2 and a bit line BL3, respectively, and second end of each memory cell string 100 is connected to a source line SL. Gates of first selection transistors Q1, Q3 and Q5 are connected to the first selection line SSL, and gates of second selection transistors Q2, Q4 and Q6 are connected to the second selection line GSL. Gates of memory cells M1 to M12 are connected to corresponding word lines WL1 to WL4, respectively.

In a write operation, the memory block 300 writes data to a selected memory cell among the memory cells M1 to M12 using FN tunneling efficiency. Taking the memory cell M2 as an example, while the source line SL is grounded, a second gate selection line GSL is biased at a voltage of about zero volts, such that the second selection transistor Q2 corresponding to the second gate selection line GSL is turned off, and a first Source Selective Line SSL is biased at a high voltage VDD, such that the first selection transistor Q1 corresponding to the first selection line SSL is turned on. Further, the bit line BL1 is grounded, a word line WL2 is biased at a programming voltage VPG, for example, about 20V, and the other word lines are biased at a low voltage VPS1.

In a read operation, the memory block 300 judges an amount of charge in a floating gate according to a conduction state of the selected memory cell among the memory cells M1 to M12, thereby obtaining data characterized by the charge amount. Taking the memory cell M2 as an example, the word line WL2 is biased at a read voltage Vread, and the other word lines are biased at a pass voltage Vpass. The conduction state of the memory cell M2 is related to its threshold voltage, that is, the amount of charge in the floating gate, so that a data value can be judged according to the conduction state of the memory cell M2. The memory cells M1, M3 and M4 are always in a conduction state, so the conduction state of the memory block 300 depends on the conduction state of the memory cell M2. A control circuit judges the conduction state of the memory cell M2 according to electrical signals detected on the bit line BL1 and the source line SL, thereby obtaining the data stored in the memory cell M2.

Figure 4:
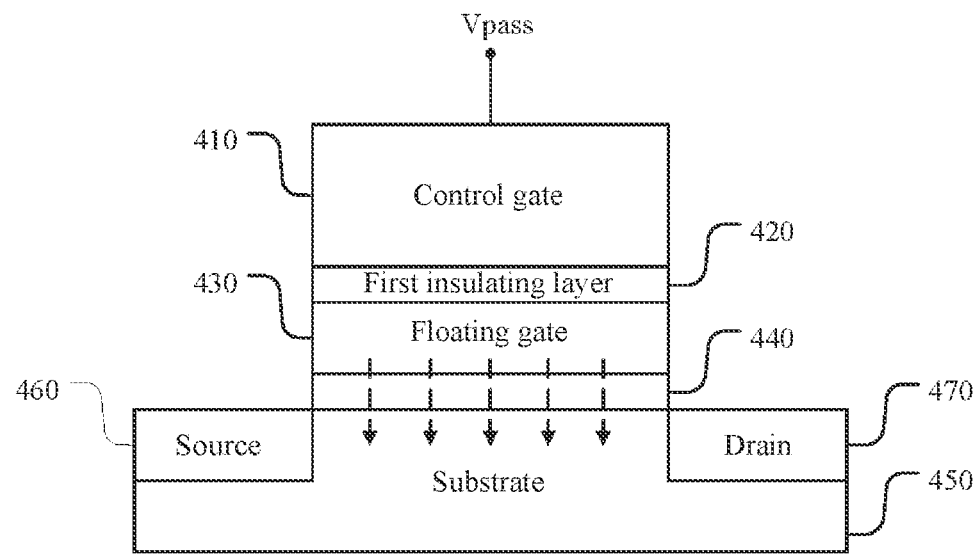
FIG. 4 shows a schematic structural diagram of a memory cell of FIG. 3 when a control gate is applied with a pass voltage.

FIG. 4 shows a schematic structural diagram of a memory cell of FIG. 3 when a control gate is applied with a pass voltage. The memory cell M1 includes a control gate 410, a first insulating layer 420, a floating gate 430, a second insulating layer 440, a substrate 450, and a source 460 and a drain 470 which are formed on the substrate 450.

The first insulating layer 420 is, for example, selected from polysilicon oxide layers, and the second insulating layer 440 is, for example, selected from tunnel oxide layers.

Referring to FIG. 3, the WL2 is a read word line, the gates of memory cells M2, M6 and M10 are applied with read voltage Vread, WL1, WL3 and WL4 are non-read word lines, and the gate of memory cell M1 is applied with pass voltage Vpass.

A gate voltage of the memory cell M1 is the pass voltage Vpass, wherein the selection of the pass voltage Vpass needs to be determined according to the highest stage of threshold for writing data, which should be higher than the highest-stage threshold by generally a second predetermined voltage V1, so as to ensure the conduction of the memory cells where the non-read word lines are located. The pass voltage Vpass forms a strong electric field between the floating gate 430 and the substrate 450, and current flows from the floating gate 430 to the substrate 450, that is, the floating gate 430 draws some electrons. With the increase of the reading times of the memory block 300, the electrons drawn by the floating gate 430 will also increase, resulting in a right shift of the threshold voltage of the memory cell M1.

Figure 5:
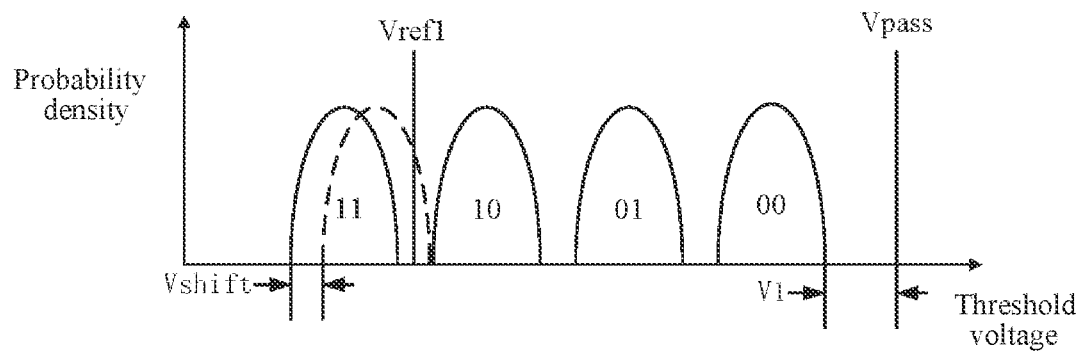
FIG. 5 shows a diagram of threshold distribution of memory cells in FIG. 4.

Referring to FIG. 5, FIG. 5 shows a schematic diagram of threshold distribution of memory cells in FIG. 4. This implementation shows a case in which the memory cells are Multi-Level Cells (MLC). It can be understood that the present disclosure is not limited thereto, and the memory cells may also be selected from Single-Level Cells (SLC), Triple-Level Cells (TLC), or Quad-Level Cells (QLC). In a 3D memory in which n bits of data are stored in each memory cell, the memory cells have $2^n$ different threshold states.

Each memory cell of the memory cell M1 stores two bits of data, with a total of four states, and the four different states can be distinguished by injecting different charges into the floating gate 430 of the memory cell. To make a memory cell conductive, a control voltage larger than the threshold voltage of the memory cell should be applied to the gate. For the memory cell M1, injecting different numbers of electrons into the floating gate 330 will change the threshold voltage of the memory cell M1. Because different states have different threshold voltages, data of a current memory cell can be judged by applying a different read voltage Vread to the control gate.

With an increase in the reading times of the data of the read word line WL2 in this block, more and more electrons enter the floating gate of the memory cell M1 in the non-read word line WL1, resulting in a change in its data state, and the threshold voltage of the memory cell M1 shifts to the right. Taking the threshold voltage representing data 11 as an example, the threshold voltage shifts to the right (the dotted line is the threshold voltage of representing data 11 after the shift), and a shift amount is Vshift, some of which is larger than a reference voltage Vref1. Therefore, when data on the word line WL1 is read, misjudgment will occur, resulting in reading the wrong data. The above situation is referred to as read disturbance, wherein the shift amount Vshift is positively related to the pass voltage Vpass and the reading times of the memory block 300.

Figure 6:
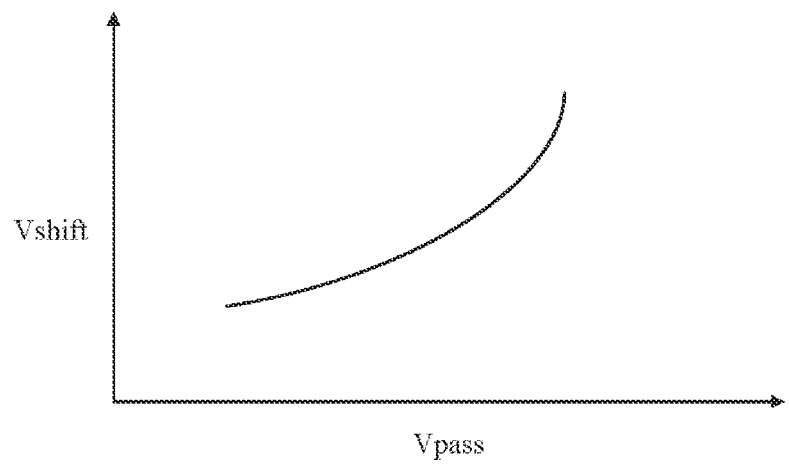
FIG. 6 shows a schematic diagram of a relationship between the pass voltage and a read disturbance shift voltage.

FIG. 6 shows a relationship between the pass voltage and the read disturbance shift. Under the condition of a constant reading times of this block, the higher the pass voltage Vpass is, the larger the shift amount Vshift of threshold voltage caused by read disturbance is.

Figure 7:
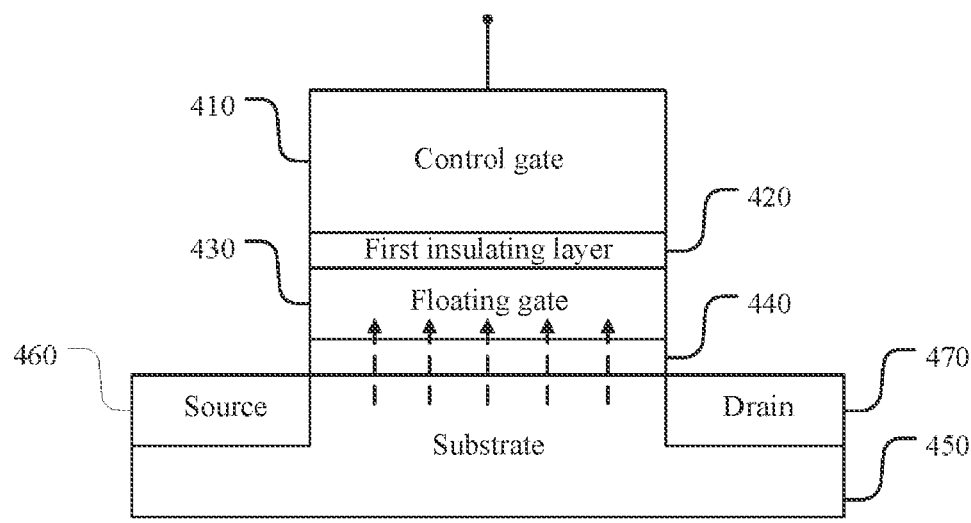
FIG. 7 shows a schematic structural diagram of the memory cell of FIG. 3 when the control gate is not applied with a voltage.

FIG. 7 shows a schematic structural diagram of the memory cell of FIG. 3 when its control gate is not applied with a voltage. The memory cell M1 includes a control gate 410, a first insulating layer 420, a floating gate 430, a second insulating layer 440, a substrate 450, and a source 460 and a drain 470 which are formed on the substrate 450.

When no voltage is applied to the gate, an intrinsic electric field will be generated, and current will flow from the substrate 450 to the floating gate 430, that is, electrons will leak from the floating gate 430, resulting in a left drift of the threshold voltage.

Figure 8:
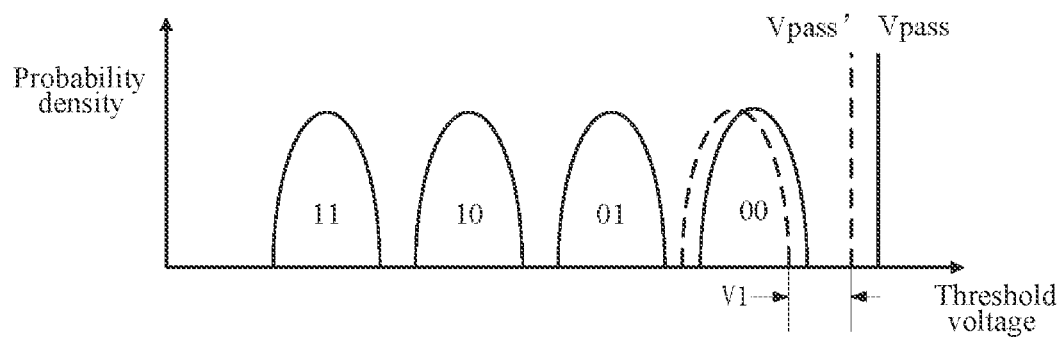
FIG. 8 shows a diagram of threshold distribution of memory cells in FIG. 7.

Referring to FIG. 8, FIG. 8 shows a diagram of threshold distribution of the memory cells in FIG. 7. Taking the threshold value of representing data 00 as an example, due to the presence of the intrinsic electric field, charges stored in the floating gate will leak, and the threshold voltage of representing data 00 drifts to the left (the dotted line is the threshold voltage of representing data 00 after drift), so that a lower pass voltage Vpass' can be used, and the read disturbance can be effectively reduced while ensuring that the pass voltage Vpass' is higher than the highest-state threshold voltage by the second predetermined voltage V1 and the data reading is not affected.

Figure 9:
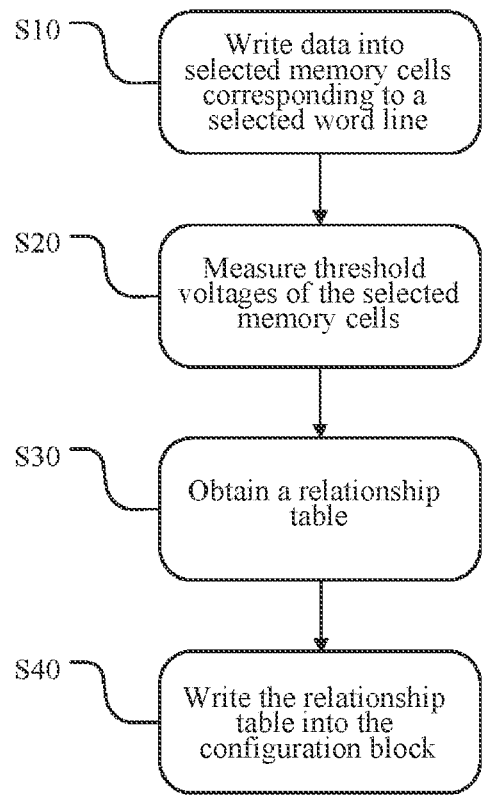
FIG. 9 shows a configuration method of a 3D memory provided by the present disclosure.

FIG. 9 shows a configuration method of a 3D memory provided by the present disclosure. The 3D memory includes a plurality of memory blocks and a configuration block, also referring to FIG. 3.

In step S10, data is written into selected memory cells corresponding to a selected word line. A word line WLn in the memory block 300 is selected as the selected word line, for example, a word line WL2 is selected as the selected word line. When writing data in the memory block 300, data is written into the memory cells on the selected word line WL2. A programming voltage is applied to gates of a plurality of selected memory cells of the memory block 300, and a pass voltage is applied to gates of a plurality of unselected memory cells of the memory block 300; wherein data written into the selected word line WL2 is known data which indicates that stored data and the threshold distribution corresponding to the stored data are already known.

In step S20, threshold voltages of the selected memory cells are measured.

In step S30, a relationship table is obtained. The relationship table indicates a corresponding relationship between a number of memory cells with the threshold voltages less than a first predetermined voltage among the plurality of selected memory cells and the pass voltage.

Figure 10:
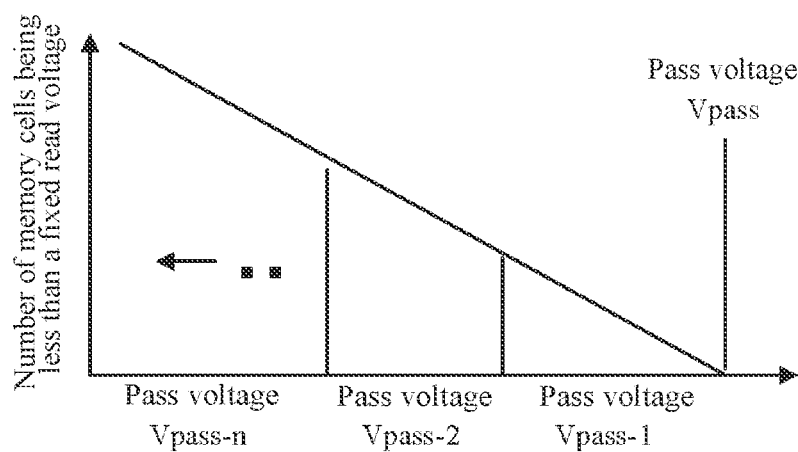
FIG. 10 shows a simplified schematic diagram of a relationship table between a number of memory cells being less than a fixed read voltage and the pass voltage.

FIG. 10 shows a simplified schematic diagram of a relationship table between a number of memory cells being less than a fixed read voltage and the pass voltage. The more the number of memory cells being less than the first predetermined voltage Vfix among the memory cells corresponding to the selected word line WL2 is, the smaller the pass voltage Vpass-n required for the read operation of the memory block 300 is.

In step S40, the relationship table is written into the configuration block. The relationship table obtained in step S30 is written into the configuration block, wherein the configuration block is a block for storing various configuration information including the relationship table.

According to the configuration method of a 3D memory provided by the disclosure, the relationship table is obtained by writing a large amount of data and is stored in the configuration block, and in the subsequent reading method, the corresponding pass voltage can be quickly selected according to the detected number of memory cells being less than the first predetermined voltage on the selected word line, without the need for a user to manually adjusting, which is more convenient. Meanwhile, an interface for adjusting the pass voltage does not need to be opened, thus ensuring the security and stability of the 3D memory.

Figure 11:
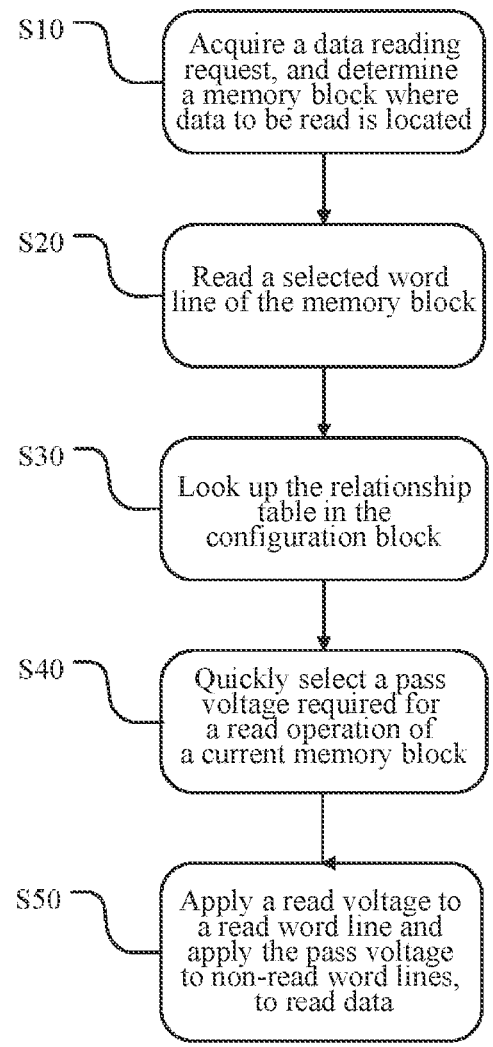
FIG. 11 shows a reading method of a 3D memory provided by the present disclosure.

FIG. 11 shows a reading method of a 3D memory provided by the present disclosure. The 3D memory includes a plurality of memory blocks and a configuration blocks, also referring to FIG. 3.

In step S10, a data reading request is acquired, and a memory block where the data to be read is located is determined. The data reading request is acquired. The data reading request includes an address of the data to be read, and the memory block where the data to be read is located is determined according to the address of the data to be read.

In step S20, a selected word line WLn of the memory block is read to obtain a number of memory cells with threshold voltages less than a first predetermined voltage among a plurality of selected memory cells corresponding to the selected word line. For example, the selected word line is WL2, the first predetermined voltage Vfix is applied to the selected word line WL2, threshold distribution in the memory cells M2, M6 and M10 corresponding to the selected word line WL2 is detected. If the threshold voltage of a certain memory cell is lower than the first predetermined voltage Vfix, it is determined that the memory cell is less than the first predetermined voltage Vfix, and thereby obtaining the number of memory cells being less than the first predetermined voltage Vfix among the memory cells corresponding to the selected word line WL2.

Figure 12:
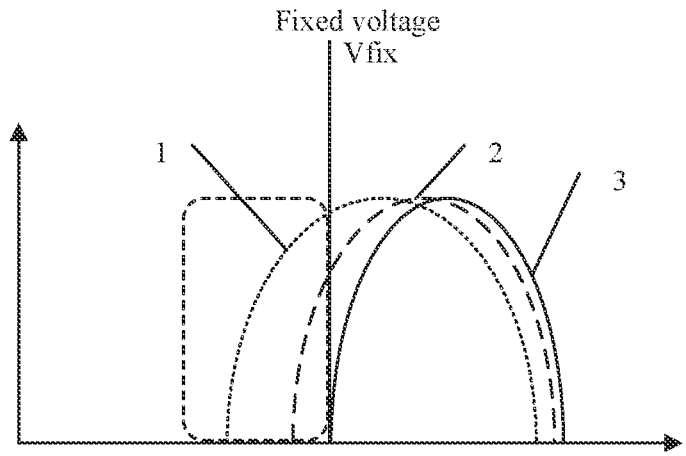
FIG. 12 shows a schematic diagram of threshold distribution of memory cells corresponding to a selected word line.

As shown in FIG. 12, FIG. 12 shows a schematic diagram of threshold distribution of memory cells corresponding to a selected word line. According to the foregoing, if the threshold voltage of a certain memory cell is less than the first predetermined voltage Vfix, it is determined that the memory cell is less than the first predetermined voltage Vfix. Thus, the threshold distribution labeled 1 corresponds to a maximum number of memory cells less than the first predetermined voltage Vfix among the memory cells. The threshold distribution labeled 2 corresponds to a smaller number of memory cells less than the first predetermined voltage Vfix among the memory cells. The threshold distribution labeled 3 corresponds to a minimum number of memory cells less than the first predetermined voltage Vfix, which is zero, among the memory cells.

In step S30, the relationship table in the configuration block is looked up.

In step S40, a pass voltage required for a read operation of a current memory block is quickly selected. According to the number of memory cells with the threshold voltages less than the first predetermined voltage among a plurality of selected memory cells corresponding to the selected word line WL2 obtained in step S20 and the relationship table read in step S30, the corresponding pass voltage Vpass-n is quickly selected, which is the pass voltage required for the read operation of the memory block 300.

In step S50, a read voltage Vread is applied to a read word line, and the pass voltage Vpass-n is applied to non-read word lines to read data. The read voltage Vread is applied to the read word line of the memory block 300, and the pass voltage Vpass-n is applied to the non-read word lines to read the data in the memory block 300.

Wherein the pass voltage Vpass-n is less than or equal to an initial pass voltage Vpass.

According to the reading method of the 3D memory provided by the present disclosure, the pass voltage is dynamically adjusted according to the reading times of the memory blocks and the threshold distribution of the memory cells, and the pass voltage is dynamically reduced on the premise of ensuring that the pass voltage is higher than a highest-stage threshold voltage, so that the read disturbance caused by reading the memory blocks is reduced, and the reliability of data storage is increased, thereby improving the overall read performance of the 3D memory.

Further, the pass voltage is independently adjusted for each of the memory blocks in the 3D memory, and different pass voltages are set according to the reading times of different memory blocks. The pass voltage of the memory block with more reading times is relatively low, and the pass voltage of the memory block with fewer reading times is relatively high, so it is unnecessary to unify the pass voltages of all memory blocks at a high potential, thus further improving the overall performance of the 3D memory.

Figure 13:
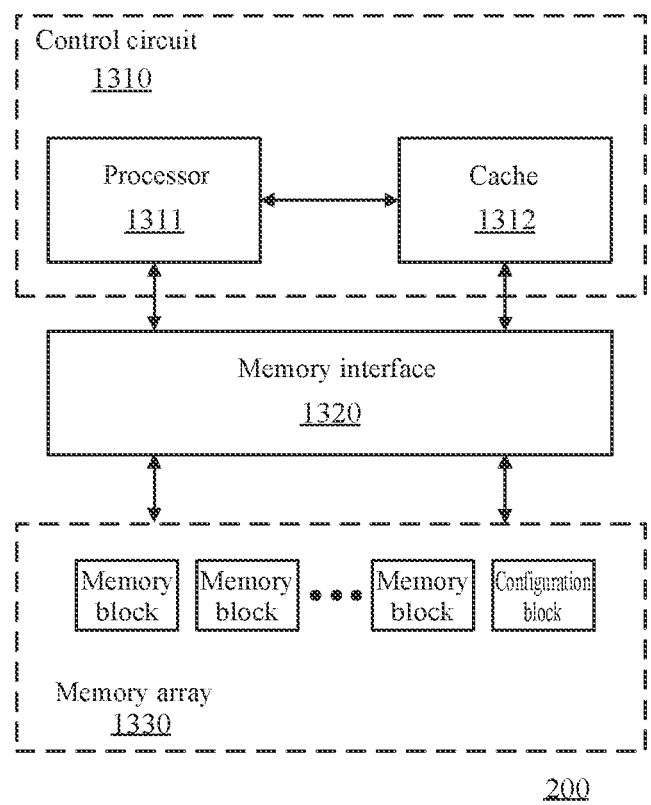
FIG. 13 shows a 3D memory provided by the present disclosure.

FIG. 13 shows a 3D memory provided by the present disclosure. The 3D memory 200 provided by the present disclosure includes a control circuit 1310, a memory interface 1320, and a memory array 1330.

The control circuit 1310 is connected to the memory interface 1320, and is used for reading data in the memory array 1330 and writing data into the memory array 1330.

The control circuit 1310 includes a processor 1311 and a cache 1312. The processor 1311 can implement an access request for accessing the memory array 1330 and manage the data in the memory array 1330. The processor 1311 is selected from, for example, a Central Processing Unit (CPU), an Application Specific Integrated Circuit (ASIC), or one or more integrated circuits configured with the above functions.

The cache 1312 is connected with the processor 1311, and is used for caching data that the processor 1311 is waiting to write into the memory array 1330, or caching data that is read from the memory array 1330. The cache 1312 is a temporary memory located between the processor 1311 and the memory, and has a smaller capacity than the memory but a faster reading and writing speed than the memory.

The memory interface 1320 is connected with the memory array 1330, and is used for communication with the memory array 1330 and data transmission between the control circuit 1310 and the memory array 1330. For example, the memory interface 1320 may be used to manage an access command issued to the processor 1311 for accessing the memory array 1330 and to transmit data.

The memory array 1330 includes a plurality of memory blocks for storing data and a configuration block for storing various configuration information including a relationship table.

The memory array 1330 is selected for example from 3D flash memory devices, and the memory cells are selected from MLCs.

As mentioned above, the read disturbance of the 3D memory is positively related to the magnitude of the pass voltage Vpass. In order to reduce the read disturbance, the pass voltage Vpass can be dynamically adjusted according to the drift amount of the highest-state threshold in the memory cell.

In the configuration method, the control circuit 1310 selects one word line as a selected word line in one or more memory blocks of the memory array 1330, respectively, writes data into the one or more memory blocks, and writes known data into the selected word line in the memory block. Wherein the known data indicates that stored data and threshold distribution corresponding to the stored data are already known.

Under the control of the control circuit 1310, the process of writing data into the memory block is repeated to write in a large amount of data, so as to obtain a relationship table between a number of memory cells being less than a first predetermined voltage on each selected word line and a pass voltage, as shown in FIG. 10.

FIG. 10 shows a simplified schematic diagram of a relationship table between a number of memory cells with threshold voltages less than a fixed read voltage and a pass voltage. The more the number of memory cells being less than the first predetermined voltage Vfix among the memory cells corresponding to the selected word line is, the smaller the pass voltage Vpass-n required for the read operation of the memory block 300 is.

The control circuit 1310 writes the obtained relationship table of each word line into the configuration block in the memory array 1330, wherein the configuration block is a memory block for storing various configuration information including the relationship table.

In the reading method, to read data from a memory block of the memory array 1330, first, under the control of the control circuit 1310, a selected word line of the memory block is read. As shown in FIG. 11, the first predetermined voltage Vfix is applied to the selected word line to obtain the number of memory cells being less than the first predetermined voltage Vfix among the memory cells corresponding to the selected word line, the number of memory cells being for example m.

At the same time, the control circuit 1310 reads the relationship table of the selected word line of the memory block in the configuration block, looks up the pass voltage Vpass-n corresponding to m in the relationship table, and sets the pass voltage Vpass-n as the pass voltage during the read operation for the memory block.

Under the control of the control circuit 1310, the read voltage Vread is applied to a read word line, and the pass voltage Vpass-n is applied to non-read word lines to read data in the word line to be read.

According to the 3D memory provided by the present disclosure, the pass voltage is dynamically adjusted according to the reading times of the memory blocks and the threshold distribution of the memory cells, and the pass voltage is dynamically reduced on the premise of ensuring that the pass voltage is higher than a highest-stage threshold voltage, so that the read disturbance caused by reading the memory blocks is reduced, and the reliability of data storage is increased, thereby improving the overall read performance of the 3D memory.

Further, according to the 3D memory provided by the present disclosure, a relationship table is stored in the configuration block of the memory array in advance, and the relationship table records the relationship between the number of memory cells being less than the first predetermined voltage and the corresponding pass voltage. During operation, the control circuit quickly selects the corresponding pass voltage from the relationship table according to the detected number of memory cells with the threshold voltages less than the first predetermined voltage on the selected word line, without the need for a user to manually adjusting the pass voltage, which is more convenient, and at the same time, there is no need to open an interface for adjusting the pass voltage, thereby ensuring the security and stability of the 3D memory.

Further, the pass voltage is independently adjusted for each of the memory blocks in the 3D memory. The control circuit independently adjusts the pass voltage of respective memory blocks according to the number of memory cells being less than the first predetermined voltage on the selected word line in different memory blocks. The pass voltage of the memory block with more reading times is relatively low, and the pass voltage of the memory block with fewer reading times is relatively high, so that it is unnecessary to unify the pass voltages of all memory blocks at a high potential, thus further improving the overall performance of the 3D memory.

To sum up, according to the configuration method and reading method of a 3D memory and the 3D memory provided by the present disclosure, the pass voltage is dynamically adjusted according to the reading times of the memory blocks and the threshold distribution of the memory cells, and the pass voltage is dynamically reduced on the premise of ensuring that the pass voltage is higher than the highest-stage threshold voltage, so that the read disturbance caused by reading the memory blocks is reduced, and the reliability of data storage is increased, thereby improving the overall read performance of the 3D memory.

Further, according to the configuration method and reading method of a 3D memory and the 3D memory provided by the present disclosure, a relationship table is stored in the configuration block of the memory array in advance, and the relationship table records the relationship between the number of memory cells being less than the first predetermined voltage and the corresponding pass voltage. In the reading method, the control circuit quickly selects the corresponding pass voltage from the relationship table according to the detected number of memory cells being less than the first predetermined voltage on the selected word line, without the need for a user to manually adjusting the pass voltage, which is more convenient, and at the same time, there is no need to open an interface for adjusting the pass voltage, thereby ensuring the security and stability of the 3D memory.

Further, the pass voltage is independently adjusted for each of the memory blocks in the 3D memory. The control circuit independently adjusts the pass voltage of respective memory blocks according to the number of memory cells being less than the first predetermined voltage on the selected word line in different memory blocks. The pass voltage of the memory block with more reading times is relatively low, and the pass voltage of the memory block with fewer reading times is relatively high, so that it is unnecessary to unify the pass voltages of all memory blocks at a high potential, thus further improving the overall performance of the 3D memory.

Figure 14:
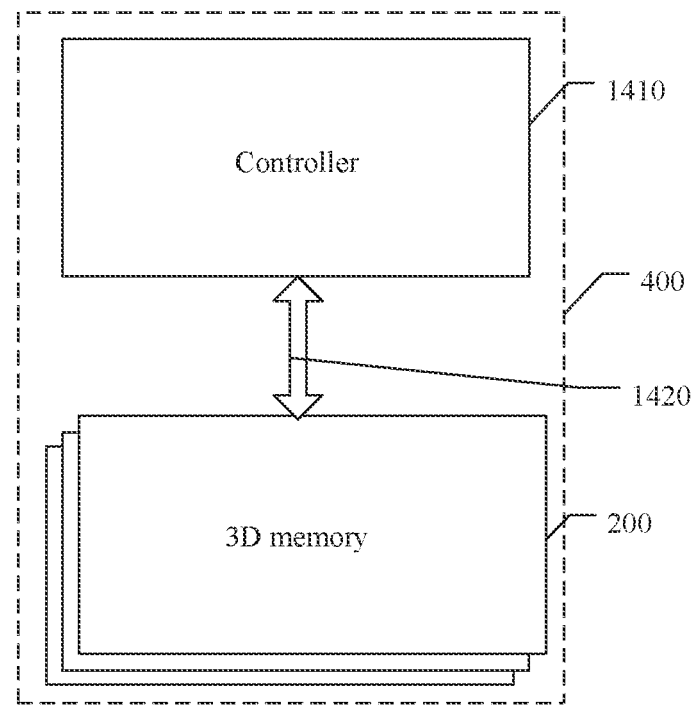
FIG. 14 shows a schematic structural diagram of a memory system provided by the present disclosure.

Based on the aforementioned inventive concept, as shown in FIG. 14, the present disclosure further provides a memory system 400, including: any 3D memory 200 described above; and a controller 1410 connected through a control interface 1420, wherein the controller controls the 3D memory 200 through the control interface.

In some implementations, the memory system 400 further includes a communication interface through which the controller communicates with a coupled host to receive an operation command of the host.

In some implementations, the communication interface is one of: a Serial Advanced Technology Attached (SATA) interface, a High-Speed Peripheral Component Interconnect Express (PCIe) interface, a PCI interface, a PCI-X interface, a Universal Serial Bus (USB) interface, a Universal Flash Storage (UFS) interface, or an eMMC interface.

Figure 15A:
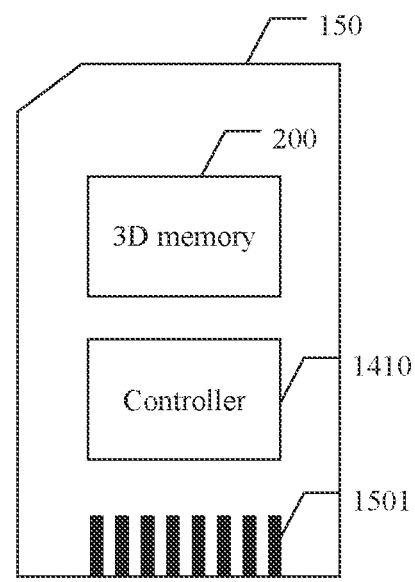
FIG. 15 (A) shows a schematic diagram of an exemplary memory card having a memory system according to some aspects provided by the present disclosure.
Figure 15B:
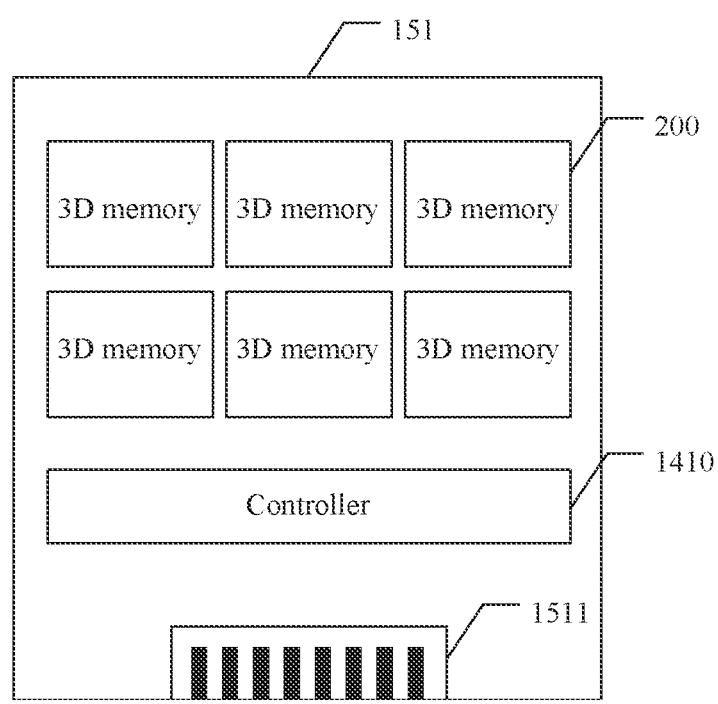

It should be noted that the memory system 400 may communicate with a coupled host. Wherein, the host and/or the memory system 400 may be included in various products, such as Internet of Things (IoT) devices, such as refrigerators or other devices, sensors, motors, mobile communication devices, automobiles, unmanned driving, etc., for supporting the processing, communication or control of products. In one implementation, the memory system 400 may be a discrete memory or a memory component of a host device. In other implementations, the memory system 400 may also be a part of an integrated circuit, such as a System on Chip (SOC). In this case, the memory system 400 is stacked or otherwise assembled with one or more components of the host. In other implementations, the aforementioned memory system may be embodied and packaged in products such as memory cards and drives, etc., such as those shown in FIG. 15(A) and FIG. 15(B), where FIG. 15(A) shows a schematic diagram of an exemplary memory card with a memory system according to some aspects provided by the present disclosure; FIG. 15(B) shows a schematic diagram of an exemplary Solid State Drive (SSD) with a memory system according to some aspects of the present disclosure. In an example as shown in FIG. 15(A), the controller 1410 of the memory system and a single 3D memory 200 may be integrated into a memory card 150. The memory card 150 may include a PC card (Personal Computer Memory Card International Association, PCMCIA), a CF card, a Smart Media (SM) card, a memory stick, a multimedia card (MMC, RS-MMC, MMCmicro), a SD card (SD, miniSD, microSD, SDHC), a UFS, etc. The memory card 150 may also include a memory card connector 1501 that couples the memory card 150 with the host. In another example as shown in FIG. 15(B), the memory controller 1410 and a plurality of 3D memories 200 may be integrated into an SSD 151. The SSD 151 may also include an SSD connector 1511 that couples the SSD 151 with the host. In some implementations, the SSD 151 has a greater storage capacity and/or operation speed than the memory card 150.

In some implementations, the host may include a processor and a host RAM. Wherein, the host RAM may include a DRAM, a SDRAM, or any other suitable volatile or non-volatile memory device. The memory system 400 may be provided with one or more communication interfaces to communicate with one or more components in the host. One or more components in the host may be a Serial Advanced Technology Attached (SATA) interface, a High-Speed Peripheral Component Interconnect Express (PCIe) interface, a Universal Serial Bus (USB) interface, a Universal Flash Storage (UFS) interface, or an eMMC interface, etc. The host may further include an electronic element, a memory card reader, or one or more other electronic elements external to the memory system 400.

In some implementations, the controller 1410 may receive instructions from the host and communicate with the 3D memory 200. For example, the controller 1410 transmits data to one or more memory cells, planes, sub-blocks, blocks or pages in the 3D memory 200 by executing write or erase instructions. Alternatively, the controller 1410 transmits data to the host by executing a read instruction. In hardware, the controller 1410 may include one or more controller units, circuits or components configured to control access across the 3D memory 200 and provide a translation layer between the host and the memory system 400. The controller 1410 may further include one or more Input/Output (I/O) circuits, lines or interfaces to transmit data to or from the 3D memory 200. The controller 1410 may further include a memory management unit and an array control unit.

The memory management unit may include circuit hardware or firmware, such as multiple components or integrated circuits associated with various memory management functions. A NAND memory is taken as an example of a memory system to operate or manage functions. Those skilled in the art should know that other forms of non-volatile memory can have similar memory operation or management functions. Wherein the management functions of the NAND memory may include wear leveling, such as garbage collection or reclamation, error detection or correction, block retirement, or one or more other memory management functions. The memory management unit can process the instructions of the host into commands recognizable by the memory system 400, such as parsing or formatting the instructions received from the host into commands related to the operation of the 3D memory 200. Alternatively, the memory management unit may also generate device commands for the array control unit or one or more other components of the memory system 400, such as commands to implement various memory management functions.

The memory management unit may be configured to include a set of management tables for maintaining various information associated with one or more components of the memory system 400, such as various information related to the memory array coupled to the controller 1410 or one or more memory cells. For example, the management table may include information such as a block age, a block erase count, an error history or one or more error counts of one or more blocks of a memory cell coupled to the controller 1410. Wherein, the error count may include an operation error count, a bit reading error count, etc. In some implementations, if the detected error count is higher than a certain threshold, the bit error is an uncorrectable bit error. In some implementations, the management table may maintain a count of correctable or uncorrectable bit errors, etc. The management table may also contain one or more L2P tables, which contain one or more L2P pointers associating using logical addresses with physical addresses at the 3D memory 200. In some implementations, the management table may include an unencrypted L2P table and/or an encrypted L2P table. The unencrypted L2P table may include L2P pointers indicating unencrypted logical addresses and unencrypted physical addresses. The encrypted L2P table may include encrypted L2P pointers to encrypted physical addresses and unencrypted logical addresses. In actual application process, the management table may be shown at the memory management unit, that is, the management table may be stored in the RAM of the controller 1410. In other implementations, the management table may also be stored in a memory array in the 3D memory 200. In use, the memory management unit may read part or all of the cached management tables from the RAM of the controller 1410, or read the management tables from the 3D memory 200.

The array control unit may include a circuitry or components configured to control to complete the following related memory operations. For example, the array control unit controls the writing of data into one or more memory cells in the memory system 400 coupled to the controller 1410, the reading of data from the one or more memory cells, or the erasing of the one or more memory cells. The array control unit may receive a command sent by the host or a host command generated inside the memory management unit, and the host command may be a command related to wear leveling, error detection or correction, etc.

The array control unit may also include an Error Correction Code (ECC) component, which may include an ECC engine or other circuitry for detecting or correcting errors related to errors that may occur in the process of writing data to or reading data from one or more memory cells in the memory system 400 coupled to the controller 1410. The controller 1410 is configured to effectively detect and recover from error events related to various operations or data storage, such as bit errors, operation errors, etc., while maintaining the integrity of data transmitted between the host and the memory system 400, or maintaining the integrity of stored data. For example, a Redundant Array of Independent Disks (RAID) or the like may be used, and failed memory resources, such as memory cells, memory arrays, pages, blocks and the like can be removed, such as retired, to prevent future errors.

It should be noted that those skilled in the art can understand that the terms "during", "when" and "while" related to circuit operation as used herein are not strict terms to indicate actions that occur immediately at the beginning of a startup action, but there may be some small but reasonable one or more delays between them and the reaction initiated by the startup action, such as various transmission delays, etc. As use herein, the term "about" or "substantially" means that the element has a parameter expected to be close to the declared value or position. However, as is known in the art, there is always a slight deviation that makes it difficult for this value or position to be strictly the declared value. It has been properly determined in the art that a deviation of at least ten percent (10%) (for semiconductor doping concentration, at least twenty percent (20%)) is a reasonable deviation from the described accurate ideal target. When used in conjunction with signal states, the actual voltage value or logic state (e.g., "1" or "0") of a signal depends on whether positive logic or negative logic is used.

According to the implementations of the present disclosure, as described above, these implementations do not go into all details, nor do they limit the disclosure to specific implementations only. Obviously, many modifications and variations are possible in light of the above description. These implementations are selected and described in detail in this description to better illustrate the principle and practical application of the present disclosure, such that those skilled in the art can make good use of the present disclosure and the modifications based on the present disclosure. The scope of protection of the present disclosure shall be subject to the scope defined by the claims of the present disclosure and their equivalents.

What is claimed is:

1. A method for configurating a memory device, comprising:
    writing test data into a plurality of selected memory cells corresponding to a selected word line in one of a plurality of memory blocks of the memory device;
    determining threshold voltages of the plurality of selected memory cells; and
    obtaining a relationship table indicating a corresponding relationship between a plurality of numbers Ncell and a plurality of voltages Vpass,
    wherein each Ncell indicates a number of a subset of the plurality of selected memory cells that have threshold voltages lower than a preset voltage, and each Vpass indicates a pass voltage required to be applied on non-selected word lines for performing a read operation on the one of the plurality of memory blocks.

2. The method of claim 1, further comprising:
    writing the relationship table into a configuration block of the memory device.

3. The method of claim 1, wherein writing test data in the plurality of selected memory cells comprising:
    applying a programming voltage to the selected word line; and
    applying a biased voltage to unselected word lines in the one of the plurality memory blocks.

4. The method of claim 1, wherein a threshold voltage distribution corresponding to the test data is predetermined.

5. The method of claim 2, further comprising:
    writing a plurality of relationship tables corresponding to the plurality of memory blocks into the configuration block.

6. The method of claim 1, wherein a smaller Vpass in the relationship table corresponds to a larger Ncell.

7. The method of claim 1, wherein the pass voltage is higher than a highest threshold voltage of the subset of the selected memory cells.

8. A method for reading data from a memory device, comprising:
    receiving a data reading request comprising an address of data to be read;
    determining, based on the address, a memory block from a plurality of memory blocks of the memory device where the data to be read is stored;
    applying a preset voltage to a selected word line of the memory block to obtain a number of a subset of selected memory cells corresponding to the selected word line that have threshold voltages lower than the preset voltage;
    determining a pass voltage required for performing a read operation on the memory block corresponding to the number based on a relationship table indicating a corresponding relationship between a plurality of numbers Ncell and a plurality of voltages Vpass, wherein one Vpass indicates the pass voltage and one corresponding Ncell indicates the number of the subset of the selected memory cells that have threshold voltages lower than the preset voltage; and
    applying the pass voltage on non-selected word lines and applying a read voltage on the selected word line to read the data.

9. The method of claim 8, further comprising:
    retrieving the relationship table from a configuration block of the memory device.

10. The method of claim 9, wherein applying the preset voltage to the selected word line comprises:
    determining a threshold voltage of each of the selected memory cells corresponding to the selected word line when the preset voltage is applied to the selected word line; and determining whether the threshold voltage of each of the selected memory cells is lower than the preset voltage to obtain the number of the subset of the selected memory cells.

11. The method of claim 9, wherein the configuration block stores a plurality of relationship tables corresponding to a plurality of memory blocks of the memory device.

12. The method of claim 9, wherein the pass voltage is lower than or equal to an initial pass voltage of the memory block.

13. The method of claim 9, wherein a smaller Vpass in the relationship table corresponds to a larger Ncell.

14. The method of claim 9, wherein the pass voltage is higher than a highest threshold voltage of the subset of the selected memory cells.

15. A three-dimensional memory device, comprising:
a memory array comprising a plurality of memory blocks; and
a control circuit connected with the memory array through a memory interface;
wherein the control circuit is configured to:
  write test data into a plurality of selected memory cells corresponding to a selected word line in a memory block of the plurality of memory blocks in the memory device;
  measure threshold voltages of the plurality of selected memory cells; and
obtain a relationship table indicating a corresponding relationship between a plurality of numbers Ncell and a plurality of voltages Vpass,
  wherein each Ncell indicates a number of a subset of the plurality of selected memory cells that have threshold voltages lower than a preset voltage, and each Vpass indicates a pass voltage required to be applied on non-selected word lines for performing a read operation on the memory block.

16. The memory device of claim 15, further comprising:
a configuration block configured to store a plurality of relationship tables corresponding to the plurality of memory blocks;
wherein the control circuit is further configured to write the plurality of relationship tables into the configuration block.

17. The memory device of claim 15, wherein the control circuit is further configured to:
receive a data reading request comprising an address of data to be read;
determine, based on the address, one corresponding memory block where the data to be read is stored;
apply the preset voltage to a selected word line of the one corresponding memory block to obtain a number of a subset of selected memory cells corresponding to the selected word line of the one corresponding memory block that have threshold voltages lower than the preset voltage;
determining one pass voltage required for performing the read operation on the one corresponding memory block corresponding to the number of a subset of selected memory cells corresponding to the selected word line of the one corresponding memory block based on the relationship; and
applying the one pass voltage on non-selected word lines and applying a read voltage on the selected word line of the one corresponding memory block to read the data.

18. The memory device of claim 17, wherein the one pass voltage is lower than or equal to an initial pass voltage of the one corresponding memory block.

19. The memory device of claim 17, wherein the control circuit comprises:
a processor configured to issue an access request for the memory array and manage data stored in the memory array; and
a cache connected with the processor and configured to cache data to be written into the memory array or data to be read from the memory array.

20. The memory device of claim 17, wherein the one pass voltage is higher than a highest threshold voltage of the subset of the selected memory cells.

* * * * *